United States Patent [19]

Parker

[11] 4,197,872

[45] Apr. 15, 1980

[54] HIGH PRESSURE DISPENSING SYSTEM FOR MIXED LIQUIDS

[76] Inventor: Thomas A. Parker, 44 W. Essex Ave., Lansdowne, Pa. 19050

[21] Appl. No.: 897,651

[22] Filed: Apr. 18, 1978

[51] Int. Cl.² ............................................. F16K 19/00
[52] U.S. Cl. ..................................... 137/115; 137/553; 137/604; 137/613; 239/126; 239/318
[58] Field of Search ............... 137/115, 553, 556, 604, 137/613; 239/126, 310, 318

[56] References Cited

U.S. PATENT DOCUMENTS

| | | | |
|---|---|---|---|
| 1,065,466 | 6/1913 | Oie | 137/613 |
| 3,613,997 | 10/1971 | Thompson | 239/310 |

Primary Examiner—Robert G. Nilson
Attorney, Agent, or Firm—Joseph M. Corr

[57] ABSTRACT

An accurate amount of a chemical concentrate is injected and mixed into a pressurized carrier liquid stream and dispensed by employment of two calibrated in-line valves in the line siphoning the concentrate to a siphon injector. The valves are so calibrated that the operator need only set the first in-line valve at the percentage of active ingredient in the concentrate and set the second valve at the percentage of active ingredient desired in the mixture to precisely reduce the flow rate of the concentrate in the siphon line and provide an accurately mixed finished liquid at the dispensing end of the system. Such a system is particularly adapted for use in the pest control industry.

13 Claims, 3 Drawing Figures

HIGH PRESSURE DISPENSING SYSTEM FOR MIXED LIQUIDS

BACKGROUND OF THE INVENTION

This invention pertains to high pressure liquid sprayers and dispensers, particularly systems wherein a concentrated additive such as a pesticide emulsion is precisely injected into a pressurized carrier liquid such as water as the carrier liquid is exiting from the high pressure system.

STATE OF THE PRIOR ART

Since the advent of pesticide emulsion concentrates, a variety of pumping systems have been used to pump the finished emulsions for spraying or dispensing purposes. Traditionally, the operator first dilutes the concentrate with a quantity of water in a large reservoir or tank, then the finished emulsion is pumped via hoses to a nozzle and applied as a spray. The operator has to be able to accurately calculate how much concentrate to add to a given volume of water to obtain the prescribed dosage in the finished emulsion for combatting a particular pest problem. For such a calculation, he has to know the percentage of pesticide in the concentrate and the amount of diluent to be used as well as the delivery rate of the pumping system and so on.

The problem of unskilled workers not knowing how to properly dilute and apply concentrated pest control materials can lead to pesticide overdoses and misapplications. The problem is compounded when two or more concentrates are required for a single application or pest problem. Pump life, motor and engine life, and nozzle size all act together to further compound the task when applying pesticides under high pressure. A major disadvantage with dispensing such emulsions through high pressure systems is the corrosive action of the materials on such pumping systems and the effects of the solvents and pesticides in the concentrates on the gaskets and O-rings in the pumps. Accordingly, spray rigs remain in the shop more than in the field.

To date most of the injection systems advertised as being adaptable for spraying pesticides have actually been designed for some other application such as spray washing and rinsing or fertilization. Machines designed for these applications are not suitable in pest control applications since they are simply not accurate enough to comply with the current laws and regulations of governmental agencies. Exemplary of such a system is a water-powered chemical injector (available through Clearwater Engineering, El Cajon, Calif.) which can be installed into an existing irrigation system. The speed at which the injector operates is controlled by the volume and pressure of the flow of water, thereby providing a constant water to chemical ratio. The injection rate can be adjusted by hand-operated adjusting nuts located on the injection pump rocker arm. While ratios of dilutions can fairly easily be obtained, one must be a mathematical wizard to be able to determine at what setting the nuts must be placed in order to obtain a one percent finished emulsion from a concentrate containing, for example, 22.4% active ingredient. Then, once calibrated, the injector requires troublesome recalibration if a chemical of a different concentration is to be diluted and dispensed.

Another such injection system is exemplified by the Hypro Series 3396 liquid injector (available through Hypro, Incorporated, New Brighton, Minn.) which feeds a concentrate directly into the pump, mixing it with the regular pump flow. The amount of fluid injected into the pump is regulated by a needle valve which can be adjusted by a calibrated control knob. However, the operator has no way of knowing how much active ingredient is actually being introduced into the flow line since the accuracy of the injector is affected by a number of independent factors including viscosity and percentage concentration of the concentrate, pump capacity and operating pressure, and the RPMs of the motor driving the pump.

In the patent prior art, there are numerous power spray washers designed to introduce a small amount of detergent into a hot or cold high-pressure water stream, dispensing the mixture through a wand and nozzle arrangement. Such washers are illustrated in U.S. Pat. Nos. 3,491,948 and 3,613,997 among many others. In systems like these, the operator chooses the dilution ratio by adjusting a knob that produces more detergent flow in one direction or less in the other. In another type of power spray washer, as shown in U.S. Pat. No. 3,575,348, the spray mechanism includes a manually operable flow control valve which is adjustable to produce a variable ratio of detergent to water, the ratio varying directly as a function of the rate of liquid dispensed from the nozzle. Because the precise amount of pesticide in the spray cannot be known, such systems are totally unacceptable for pesticide spraying in the pest control industry.

Other patents relating to pressure washers generally and the application of power spray technology in the pest control industry are the following: U.S. Pat. Nos. 3,118,610, 3,383,044, 3,776,468, 3,801,017, 3,865,308, 3,980,230, and 3,980,231. None of these systems can be used with pesticide concentrates because they either lack the mandatory degree of calibration accuracy or, if they can be calibrated accurately, they require painstaking recalibration whenever the operator has to switch from one pesticide concentrate to another of different concentration.

A complex variety of United States Department of Agriculture, Food and Drug Administration, and Environmental Protection Agency laws and regulations govern the dilution, mixing, and application of pesticides. Using the container labelling as a legal document, the Environmental Protection Agency requires the precise measurement of pesticidal mixtures and mandates strict interpretation of dosage rates for each pesticide formulation and pest control problem. An operator is expected to know, for example, if he is applying a 1% emulsion or a 0.5% emulsion, and is subject to severe penalties for non-compliance. With the injectors and washers described above, there is no means provided to accurately meter a pesticide formulation into a high-pressure liquid stream and no way to quickly determine the final percentage of the pesticide in the finished emulsion.

SUMMARY OF THE INVENTION

It is an object of this invention to provide an accurately calibrated, high pressure liquid dispensing system including a chemical additive injector which enables an operator to dispense a finished liquid comprising a precise percentage of the additive in a carrier liquid.

It is a more specific object to provide a high pressure liquid dispenser to the pest control industry capable of simple adjustment to all possible ratios of pesticide to water.

Generally, these objects are obtained by providing in a concentrate- or additive-injected, high-pressure liquid dispensing system, two calibrated valves in the additive siphon line to the injector. The valves are so calibrated that the operator sets the first to the percentage of active ingredient in the raw concentrate and sets the second at the desired percentage concentration of ingredient in the finished liquid. In the pest control industry in the United States, this information is readily available and prominently displayed on all pesticide container labels. Indeed, every pesticide container label, by law, must contain the percentage of pesticide in the concentrate and the percentage of pesticide in the finished liquid required for all pest control problems for which that pesticide is prescribed.

The dispensing system of this invention is based upon the flow rates of liquids. Thus, even though the valves are calibrated to reflect percentages, the operator in selecting percentages for the valves is, in fact, selecting a flow rate. The effect of the two valves, then, is to precisely reduce the flow rate of the additive or concentrate in the siphon line to the injector so that an accurately mixed finished liquid is provided at the dispensing end of the system.

As used herein, the word "pesticide" includes both indoor and outdoor liquid concentrates but is not intended to be limited to the following sub-species: insecticides, such as termiticides and miticides; rodenticides; avicides; herbicides and defoliants; fungicides, germicides and bacteriostats; fumigants and repellents; odorants, deodorants and odor neutralizers.

DETAILED DESCRIPTION OF THE INVENTION

Figure 1:
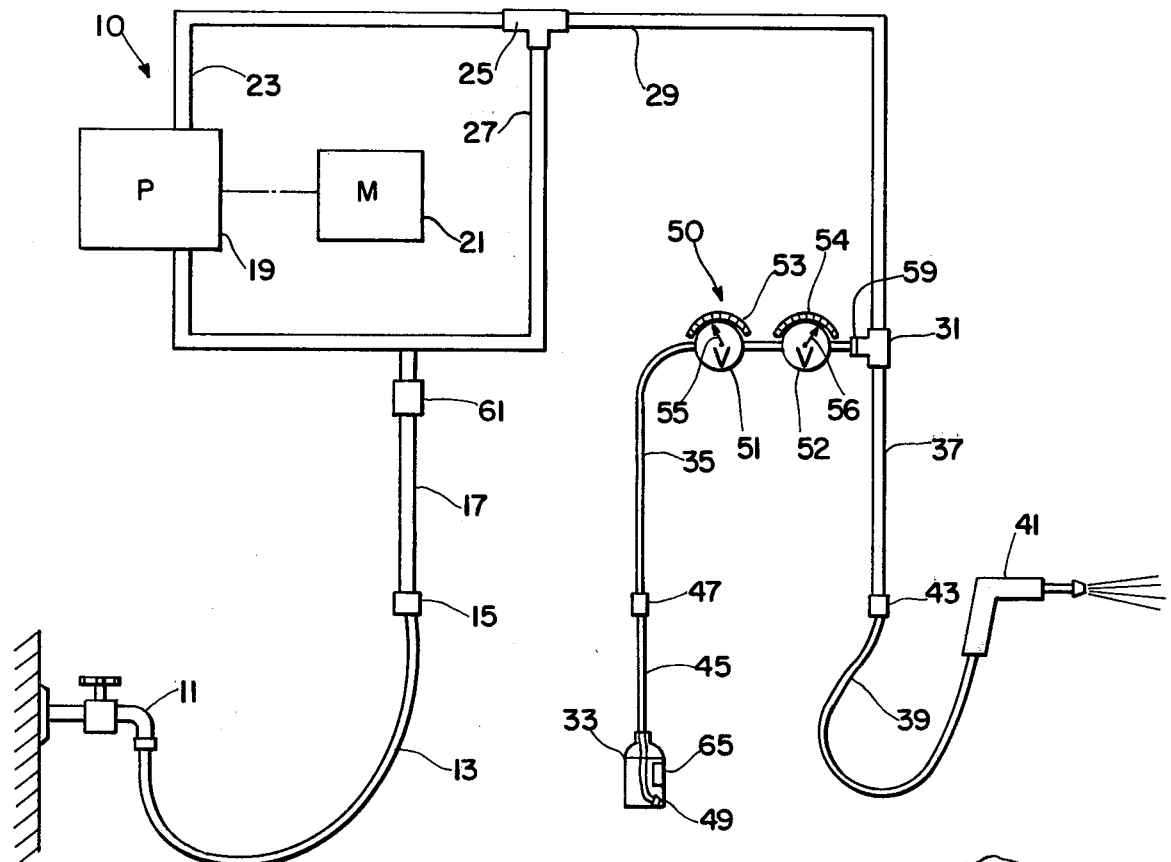
FIG. 1 is a schematic flow diagram of a preferred embodiment of the invention.

The basic system embodying this invention is shown diagrammatically in FIG. 1 wherein a garden hose hook-up supplies clear, cold water to power dispensing system 10. As shown, water under common household pressure, such as is available from an outdoor water faucet 11, is supplied to the system by means of a conventional garden hose 13. The connection may be by means of a snap or quick-connect coupling 15 which prevents water spillage when the hose is disconnected. The use of such couplings for all water connections into and out of the system is preferred since the pump unit of the power dispenser is thereby always primed and ready for use.

Alternatively, a supply of water can be siphoned from a fixed or mobile tank or reservoir if the power dispenser is to be in use in a remote area where water is not readily available. The water supply could even come from a fire hydrant, an irrigation pipe or any similar conduit.

In the dispensing system 10, conduit 17 is connected to pump 19 which is preferably a piston or positive displacement pump. A centrifugal or roller bearing pump may be employed alternatively. Pump 19 is driven by a power source 21 of known RPMs, such as an AC or DC electric motor. An alternate source of motive power, such as a two- or four-cycle gasoline engine, a propane engine, a compressed air or steam-driven motor, a tractor power takeoff (PTO) or even a wind or water-driven impeller or propeller, can be used to drive pump 19.

Conduit 23 connects the outlet of the pump to unloader valve 25. While the system is dispensing liquid, unloader valve 25 allows water to flow through the outlet of the pump and into the dispensing end of the system. When a dispensing cycle is ceased, unloader valve automatically recycles the water through the pump by means of bypass return line 27. A pressure relief valve may be used in place of unloader valve 25.

The outlet of unloader valve 25 is connected by means of conduit 29 to siphon injector 31. At injector 31, a precise amount of a chemical additive is drawn from container 33 by means of siphon tube 35 and metered into the water stream. Container 33 can be the original concentrate container or can be a fixed or mobile reservoir in which the concentrate has been prepared or stored. The liquid mixture exiting the outlet of injector 31 is then dispensed for its ultimate purpose by means of conduit 37, hose 39 and dispensing means 41. Conduit 37 and hose 39 are preferably provided with quick-connect coupling 43 so that none of the liquid mixture spills when hose 39 is disconnected.

As shown, dispensing means 41 is a pistol grip spray wand. However, other liquid dispensing means may be substituted such as boom and nozzle combinations for aerial or vehicular applications, and soil and sub-slab injectors for subterranean termite applications.

A flexible tube or hose 45 supplies concentrate to the system from container 33. Tube 45 maybe polyethylene or vinyl tubing which can be readily connected to the system by means of a conventional tapered fitting 47. Strainer screen 49 may be attached to the end of tubing 45 in the container 33 to filter out solid particles and other extraneous materials.

In siphon line 35, furnishing concentrated chemical additive from container 33 to injector 31, there is provided metering system 50, which comprises two in-line valves 51 and 52. Each of the valves are provided with calibration dials 53 and 54 and handles or pointers 55 and 56. Valves 51 and 52 are preferably ball or needle valves which when closed are capable of being fully opened by rotating the pointer or handle in an arc of less than 360°. Ideally, the arc of rotation should be between 90° and 270° to fully open valves 51 and 52. The greater the arc within the indicated range the more accurate the valve calibration can be. Also, such a range provides better visibility of the calibrations on dials 53 and 54 to the operator.

CALIBRATION

The basis for this invention is the use of two in-line valves to modify the flow rate of a concentrated chemical additive into a carrier liquid such as water. In use, the first in-line valve, that is, the valve that the concentrate passes through first on its way to the injector, acts as a coarse adjustment of flow and the second valve acts as a fine adjustment of flow. Accordingly, the first valve can be labeled Percentage of Chemical Additive in Concentrate and the second valve can be labeled *Percentage of Chemical Additive in Finished Liquid*. The number of ounces of concentrate to be added per 128 ounces (one gallon) of carrier liquid dispensed is directly proportional to a ratio of the percentage of additive in the finished liquid to the percentage of the additive in the concentrate. Thus, for example, to determine the number of fluid ounces of a 50% concentrate required to obtain a 1% finished liquid, a power spray operator would be required to calculate as follows:

oz. of concentrate=(1%/50%)
oz. of concentrate=(128/50)
oz. of concentrate=2.56 per gallon dispensed To calibrate the valves using the above calculations, for example, the second valve is set at the point where it is fully in the opened position. This valve can be arbitrarily marked 2% while the first valve is calibrated to deliver 5.12 fluid ounces of the 50% concentrate to the injector in the space of time that it takes the pump to put out one gallon of water. Wherever the handle of the first valve points on the calibration dial can then be marked 50%. Thereafter, to determine the point of the calibration dial of the second valve where the system delivers a 1% finished liquid, the first valve is left at the 50% position and the second valve is calibrated to find that point where it will allow one-half the original flow rate per gallon of finished liquid, i.e., 2.56 fluid ounces. This point on the second valve can be marked 1%.

To make that point on the second valve where the system delivers 1.28 ounces per/gallon, the first valve is again left in the 50% position and the second valve is adjusted so that it delivers 1.28 ounces in each gallon of the finished liquid. This point on the calibration dial for the second valve can be marked 0.5%. Other percentage levels can similarly be calibrated for the second valve.

Thereafter, the same mode of calibrating can be employed using a 75% concentrate (or any other concentrate, say from about 15% to 100% active ingredient). Using the same mathematical formula as above, the calibration is based on the following calculations:

$$\frac{\text{oz. of concentrate}}{128 \text{ oz.}} = \frac{1\%}{75\%}$$

oz. of concentrate=(128/75)
oz. of concentrate =1.71 per gallon dispensed

The calibrator then employs the identical technique of doubling and halfing the ounces (starting with the 2% marking on the second valve) to arrive at an accurate calibration of the dials for the 75% concentrate.

The calibration is continued until all percentage combinations of concentrate and finished liquid are provided on the calibration dials.

While it appears that the system will never dispense more than a 2% finished liquid, it should be noted that it is extremely uncommon in the power spray industry to dispense more than a 1% finished liquid. In theory, however, as long as the valving allows unlimited potential flow rates, the system can be calibrated to provide settings on the first valve beginning at a low end of 1% or 2% to a high end of 100% and settings on the second valve as low as 0.1% to a high somewhere near 30% of chemical additive in the finished liquid.

In an industry like the pest control industry, the dial for the first valve can be marked especially for concentrates more commonly used, such as, for example, 72% for chlordane or 57% for malathion. However, calibrating the dials in even multiples of 5, 10, 15 or 20% or in even tenths or one-hundredths would be more convenient for all power spray applications and provide a more versatile system.

The power dispensing system 10 of this invention may utilize more than a single metering system 50. That is, any multiple of two valves 51 and 52 and one siphon injector 31, along with the appropriate tubes and fittings, may be incorporated in conduit 29 to enable the operator to inject two or more concentrates simultaneously into the same high pressure stream.

Siphon injector 31 preferably includes a check valve 59 in the connection from siphon tube 35 and the metering system 50. Check valve 59 shuts off the siphoning action of the dispensing system if there is a decrease in the water pressure or flow, thus preventing any chemical additive from inadvertently getting into a residential water supply, such as through the garden faucet 11. Check valve 59 also prevents the high pressure stream in conduit 29 from flowing through siphon tube 35 into container 33 thereby diluting and possibly spilling the concentrate.

Ideally, other backflow preventers can be incorporated into the power dispensing system of this invention. A piston pump, for example, with its valves and ports can only pump in one direction and, therefore, is a perfect backflow preventer. Additionally, a swing- or ball-type check valve 61 can be placed in conduit 17 as a final precaution against contamination of the water source. A gallonage meter (not shown) may be substituted for check valve 61 in conduit 17 or, alternatively, be fitted in line with preventer 61. Gallonage meters typically include a check valve or backflow preventer in their construction.

The incorporation of a gallonage meter in conduit 17 is advantageous in a pesticide dispensing system according to this invention since it additionally provides the operator with a read-out of the carrier liquid input through the system and substantially accurate indication of the quantity of finished emulsion used on a particular pesticide application. The gallonage meter may be a continuous read-out meter or may be capable of being re-set to zero.

A pressure regulator (not shown) may be fitted into the by-pass return line 27 of a dispensing system according to this invention to allow the operator to control the spraying pressure of the pump. Line 27 may also include a pressure gauge.

OPERATION

The use of dispensing system 10 requires that the operator first read label 65 of container 33 to determine the percentage of active ingredient in the concentrate in container 33 and the percentage of active ingredient desired in the finished liquid. For instance, if he is engaged to perform a termite extermination using Velsicol Chemical Company's C-100 chlordane concentrate, he would first set valve 51 to 72%, the percentage of chlordane in the concentrate, then set valve 52 to 1%, the percentage mandated by label 65 to be used for termite control. After this simple operation, the operator can safely activate the power dispensing system.

Figure 2:
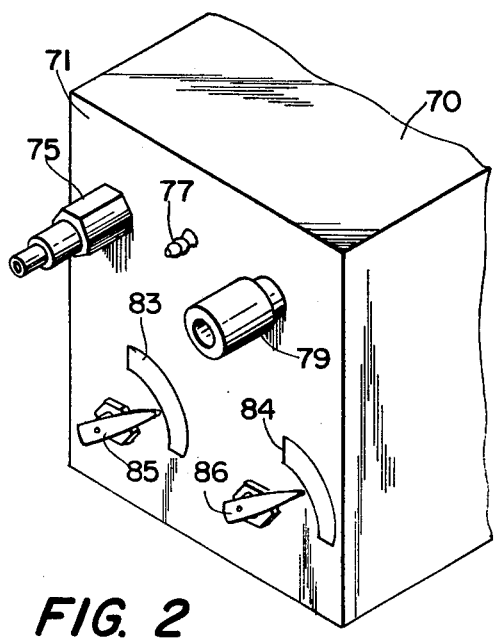
FIGS. 2 and 3 are perspective views of a portable liquid dispenser according to an embodiment of this invention.
Figure 3:
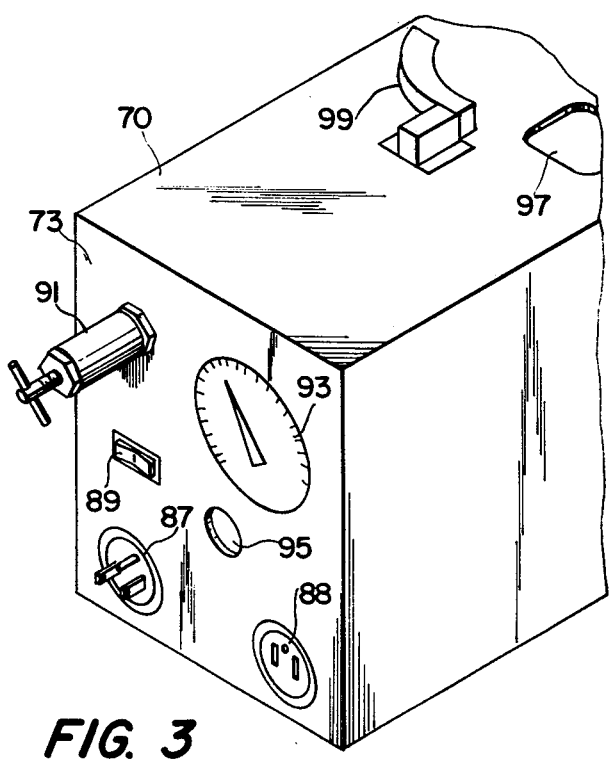

A preferred embodiment of the invention is illustrated in FIGS. 2 and 3 wherein a protective shroud or covering 70 houses the internal components of the system shown schematically in the FIG. 1 flow diagram and front and rear panels 71 and 73, respectively, provide the control and connection means for proper operation of the unit.

Front panel 71 includes inlet coupling 75, tapered fitting 77 and outlet coupling 79. Inlet coupling 75 and outlet coupling 79 may be conventional threaded couplings for attachment of a garden hose and a high pressure hose, respectively, or may be provided with snap or quick-connect coupling means. For ease and safety, quick-connect couplings are preferred. Tapered fitting 77, as illustrated, is adaptable for the attachment of polyethylene or vinyl tubing for drawing the concentrate from a bottle or other storage container into the unit and eventually to the injector (not shown). A threaded fitting may alternatively be provided.

Front panel 71 also includes calibration dials 83 and 84 for two in-line metering valves (not shown) and their respective pointer handles 85 and 86. As illustrated, the in-line metering valves are capable of being fully opened from a closed position by rotation of their respective pointers in an arc of substantially 90°. The two valves or their calibration dials can be numbered 1 and 2 or A and B, or labeled *Coarse* and *Fine*. More appropriately, however, and as a safety precaution, the first in-line valve should be clearly designated *Concentrate Percentage* and the second valve should be labeled *Spray Percentage*, or words or expressions to that effect.

Rear panel 73 of the unit contains recessed electric plug 87 to which an extension cord may be connected to provide electricity for the electric motor underneath shroud 70. Auxiliary receptacle 88 permits the operator to plug in other equipment to the unit. A three-position on/off switch 89 controls plug 87 and receptacle 88 so that in the left position the motor for the pump is operational and in the right position the auxiliary circuit is operational. In the center position, switch 89 shuts down both electric circuits. As illustrated, the pump motor and the auxiliary equipment cannot be turned on simultaneously. However, the unit may include one or more unswitched electrical receptacles to provide electricity for such units as portable lighting fixtures and the like.

Pressure regulator 91 and pressure gauge 93 may also be positioned on rear panel 73. Porthole 95 allows the operator to lubricate the grease fitting on the piston pump without having to remove shroud 70. Observation porthole 97 on the topside of shroud 70 permits the operator to view a digital read-out gallonage meter. Carrying handle 99 may also be provided on the topside of the unit making the unit totally portable.

In another embodiment of this invention, a unit such as is shown in FIGS. 2 and 3 is modified and installed on board an aerial spray aircraft in the supply line between a liquid storage tank and a conventional boom and nozzle arrangement used in aerial spraying. The pumping means used in such an installation is preferably a centrifugal or roller bearing pump powered by a wind-driven propeller mounted externally of the aircraft. When the pilot attains an appropriate air speed, a brake on the propeller shaft is released to activate the pump which accepts pure water from the storage tank and directs it under high pressure past a siphon injector to the boom and nozzle arrangement. An on/off switching means in the cockpit controls the discharge of the spray from the aircraft. At the injector, as hereinbefore described, a precise amount of a chemical concentrate is metered from a separate container into the high pressure water stream by means of two calibrated valves in the siphon tube line, each of which have been set according to the information provided on the container label.

Such an installation may include a bypass circuit with appropriate valve and control means to recirculate water through the pump when the dispensing system is shut down, such as when the pilot finishes a pass over the area to be sprayed and maneuvers the aircraft to make another pass. The installation may also be equipped with a pressure regulator and other controls necessary to insure that a predetermined pressure can be set regardless of the speed of the aircraft.

Thus, in using the power dispensing system of this invention, the operator need only know the percentage of active ingredient in the concentrate and the percentage of active ingredient desired in the finished liquid which he is dispensing. As indicated above, these percentages are printed on the labels of every pesticide in the United States. For the most part, this information is as readily available on the container labels of germicides, commercial detergents, disinfectants and other liquid concentrates capable of being dispensed by the system of this invention.

What is claimed is:

1. A system for dispensing mixed liquids wherein an accurate proportion of a concentrated liquid is metered into a high pressure carrier liquid, said system comprising:

pumping means having a known delivery rate for providing said carrier liquid under high pressure at a discharge end of said system, means connecting a source of said carrier liquid to said pumping means, valve means intermediate said pumping means and the discharge end of said system operable to recirculate carrier liquid through said pumping means whenever said system is not in a dispensing cycle, liquid injecting means intermediate said valve means and the discharge end of said system operable to meter concentrated liquid into said carrier liquid, and means connecting a source of said concentrated liquid to said injecting means, said means including two in-line valves, the first of said valves being calibrated to modify the flow rate of said concentrated liquid to said injecting means and the second of said valves being calibrated to further modify the flow rate of said concentrated liquid to said injecting means so that said two in-line valves are, in combination, operable to precisely reduce the flow rate of said concentrated liquid into said carrier liquid to provide at the discharge end of said system an accurate concentration of concentrated liquid in said carrier liquid.

2. The system as in claim 1 wherein said pumping means is a piston or positive displacement pump driven by a motive power source.

3. The system as in claim 1 wherein said pumping means is a centrifugal or roller bearing pump driven by a motive power source.

4. The system as in either claim 2 or 3 wherein said motive power source is an AC or DC electric motor.

5. The system as in either claim 2 or 3 wherein said motive power source is a two- or four-cycle gasoline engine.

6. The system as in either claim 2 or 3 wherein said motive power source is a tractor power takeoff.

7. The system as in claim 3 wherein said motive power source is a wind-driven propeller.

8. The system as in claim 1 wherein said injecting means includes a backflow preventer.

9. The system as in claim 1 wherein said two in-line valves are ball valves.

10. The system as in claim 1 wherein said two in-line valves are needle valves.

11. The system as in either claim 9 or 10 wherein said valves when closed are capable of being fully opened by rotation of a handle in an arc of less than 360°.

12. The system as in claim 1 which comprises plural means connecting sources of two concentrated liquids to two separate injecting means intermediate said valve means and the discharge end of said system wherein each of said means connecting includes two in-line valves, each of the first of said in-line valves being calibrated to modify the flow rates of said two concentrated liquids to said separate injecting means and each of the second of said in-line valves being calibrated to further modify the flow rates of said two concentrated liquids to said separate injecting means so that each set of said two in-line valves are, in combination, operable to precisely reduce the flow rate of one of said two concentrated liquids into said carrier liquid to provide at the discharge end of said system an accurate concentration of each of said two concentrated liquids in said carrier liquid.

13. A system for dispensing mixed liquids wherein an accurate proportion of a concentrated liquid is metered into a high pressure carrier liquid, said system comprising:

pumping means having a known delivery rate for providing said carrier liquid under high pressure at a discharge end of said system, means connecting a source of said carrier liquid to said pumping means, valve means intermediate said pumping means and the discharge end of said system operable to recirculate carrier liquid through said pumping means whenever said system is not in a dispensing cycle, liquid injecting means intermediate said valve means and the discharge end of said system operable to meter concentrated liquid into said carrier liquid, and means connecting a source of said concentrated liquid to said injecting means, said means including two in-line valves, the first of said valves being calibrated to selectively and adjustably modify the flow rate of said concentrated liquid to said injecting means and the second of said valves being calibrated to further selectively and adjustably modify the flow rate of said concentrated liquid to said injecting means so that said two in-line valves are, in combination, operable to precisely reduce the flow rate of said concentrated liquid into said carrier liquid to provide at the discharge end of said system an accurate concentration of concentrated liquid in said carrier liquid.

* * * * *